United States Patent
Ikezoe

(10) Patent No.: US 8,357,473 B2
(45) Date of Patent: Jan. 22, 2013

(54) FUEL CELL SYSTEM

(75) Inventor: Keigo Ikezoe, Ayase (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1179 days.

(21) Appl. No.: 11/720,272

(22) PCT Filed: Oct. 27, 2005

(86) PCT No.: PCT/JP2005/019770
§ 371 (c)(1),
(2), (4) Date: May 25, 2007

(87) PCT Pub. No.: WO2006/057134
PCT Pub. Date: Jun. 1, 2006

(65) Prior Publication Data
US 2008/0020246 A1 Jan. 24, 2008

(30) Foreign Application Priority Data

Nov. 29, 2004 (JP) .................... 2004-343780

(51) Int. Cl.
*H01M 8/04* (2006.01)
(52) U.S. Cl. ......... 429/429; 429/400; 429/428; 429/450
(58) Field of Classification Search .................. 429/400, 429/450, 428, 429
See application file for complete search history.

(56) References Cited

U.S. PATENT DOCUMENTS

| | | | |
|---|---|---|---|
| 5,658,681 A | 8/1997 | Sato et al. | |
| 6,893,758 B2 | 5/2005 | Miyazawa et al. | |
| 2004/0081870 A1 | 4/2004 | Miyazawa et al. | |
| 2006/0073367 A1 | 4/2006 | Kanno et al. | |

FOREIGN PATENT DOCUMENTS

| | | |
|---|---|---|
| JP | 8-106914 A | 4/1996 |
| JP | 2001-332281 A | 11/2001 |
| JP | 2002-208421 A | 7/2002 |
| JP | 2002-246054 | 8/2002 |
| JP | 2002-313394 A | 10/2002 |
| JP | 2003-151601 A | 5/2003 |
| JP | 2004-111196 A | 4/2004 |
| JP | 2004-234965 A | 8/2004 |
| JP | 2004-311277 A | 11/2004 |
| JP | 2005-93117 A | 4/2005 |
| WO | WO 2004/102708 A2 | 11/2004 |

*Primary Examiner* — Jane Rhee
(74) *Attorney, Agent, or Firm* — Foley & Lardner LLP

(57) ABSTRACT

When a stop trigger of a fuel cell system (100) is turned on, air humidified by a humidifier (3) which air having a humidity quantity lower than a humidity quantity at a normal operation is supplied to a fuel cell stack (11). Thereby, a takeout quantity Qm of a moisture generated in the fuel cell stack (1) is increased, then, a power generation of the fuel cell stack (1) is continued for a certain time Pg. Then, the power generation is stopped, and a cathode side of the fuel cell stack (1) is purged with the air for a certain time Pp.

20 Claims, 10 Drawing Sheets

FIG. 13
(a)
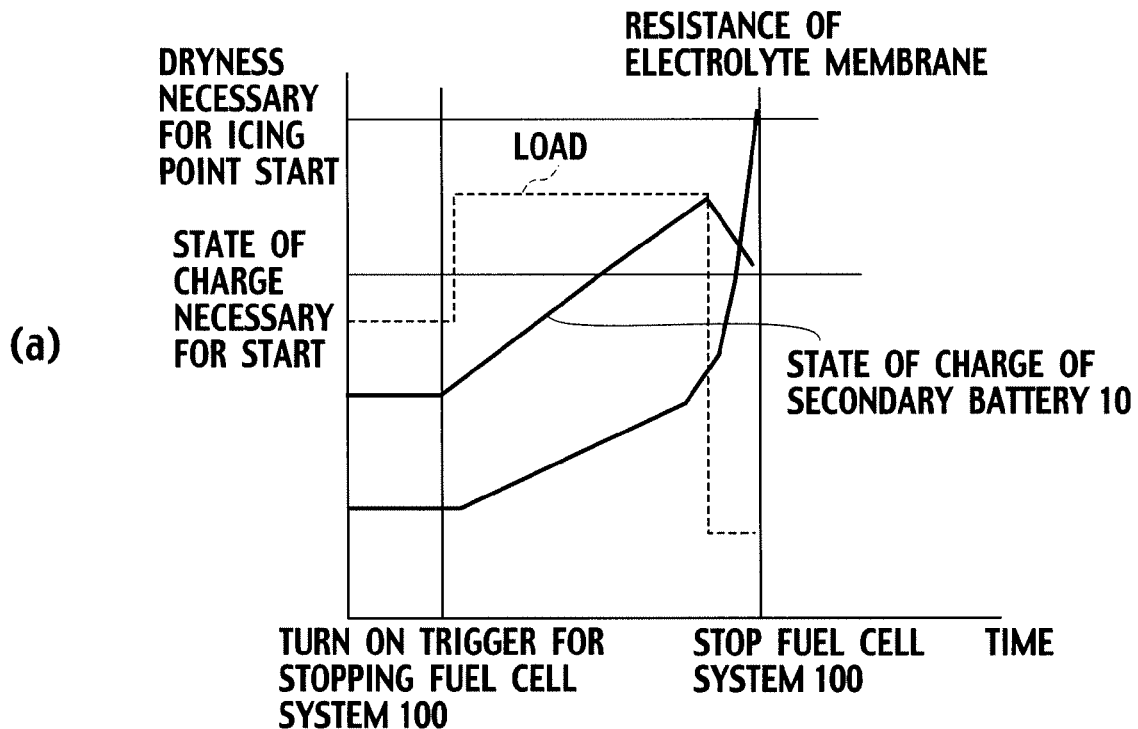
(b)
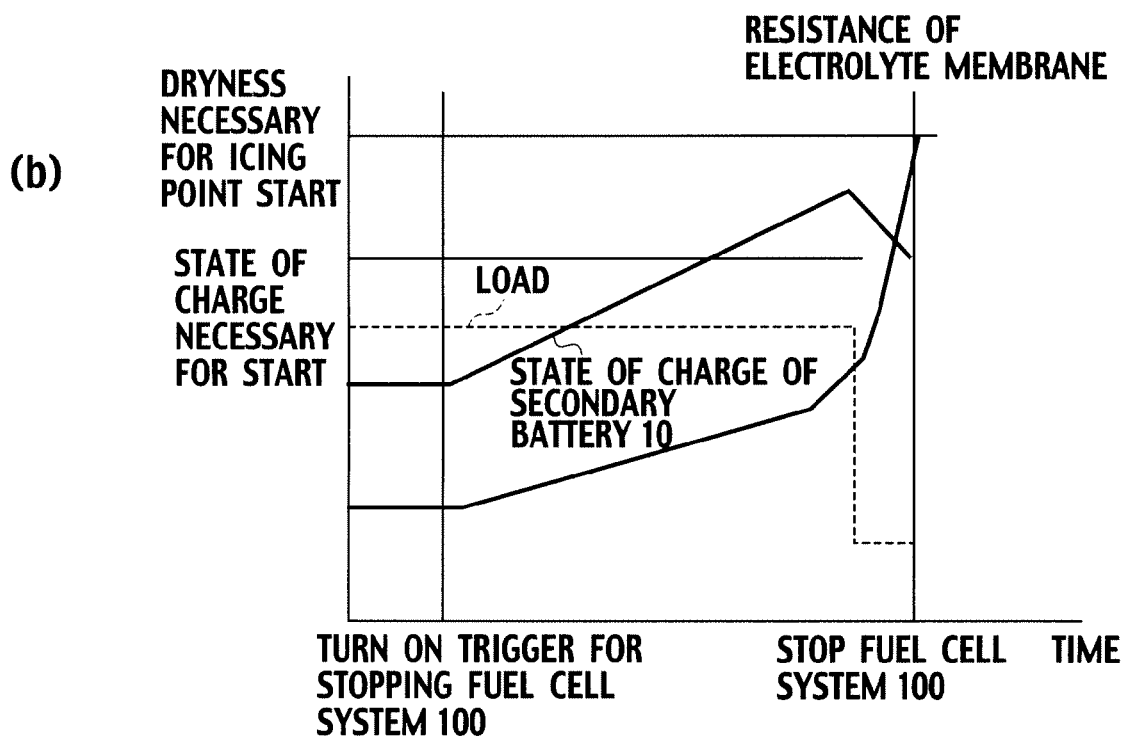

FUEL CELL SYSTEM

TECHNICAL FIELD

The present invention relates to a fuel cell system having a technology which is improved in removing moisture remaining in a fuel cell after stop of the fuel cell system, wherein the above removing is for the next operation, especially, under a low temperature environment at an icing point or less.

BACKGROUND ART

A fuel cell system converts a chemical energy of a fuel directly into an electric energy. The above fuel cell system is provided with a pair of a positive electrode (anode) and a negative electrode (cathode) with an electrolyte membrane interposed therebetween. A fuel gas containing hydrogen is supplied to the anode, while an oxidizer gas containing oxygen is supplied to the cathode, thus causing an electrical chemical reaction (shown below) on electrolyte membrane sides of the respective anode and cathode. The thus caused electrical chemical reaction helps take out the electric energy from the above electrodes. Refer to Japanese Patent Application Laid-Open No. 8 (1996)-106914 (=JP8-106914).

Positive electrode (anode): $H_2 \rightarrow 2H^+ + 2e^-$

Negative electrode (cathode electrode): $2H^+ + 2e^- + (\frac{1}{2})O_2 \rightarrow H_2O$ (Chemical Formula 1)

Known methods of supplying the hydrogen of the fuel gas to the anode include directly supplying the hydrogen from a hydrogen storer, supplying a hydrogen-containing gas through reformation of a fuel containing hydrogen, and the like. Examples of the hydrogen storer include a high pressure gas tank, a liquefied hydrogen tank, a hydrogen-absorbing alloy tank, and the like. Examples of the fuel containing hydrogen include natural gas, methanol, gasoline and the like. On the other hand, air is commonly used for the oxidizer gas supplied to the cathode electrode.

When being used for a power source for driving an automobile or being placed in a cold place, for example, the fuel cell may be exposed to a 0° C. or less atmosphere. It is desired that the fuel cell be capable of starting even in the above state and ordinarily generating power. Under the low temperature state of 0° C. or less, however, the moisture remaining in cells of the fuel cell after the former power generation is frozen, thereby causing a problem such as a power generation failure which may be attributable to blocking of a reactive gas passage for distributing the hydrogen gas or air gas or attributable to reactive gas diffusion prevention due to the freezing of remaining moisture in the vicinity of the electrodes.

For starting the fuel cell at 0° C. or less, therefore, it is necessary to remove the moisture in advance from inside the fuel cell. Japanese Patent Application Laid-Open No. 2001-332281 (=JP2001-332281) discloses a technology of supplying into the fuel cell an un-humidified air, thereby drying inside the fuel cell to a certain humidity (dried state), to thereafter stop the fuel cell system.

According to the technology of JP2001-332281, however, drying inside the fuel cell with the reactive gas which is merely un-humidified takes a long time to accomplish a sufficient dried state for the power generation from 0° C. or less, which is problematical. Especially, when the fuel cell is used for the power source for driving the vehicle, a long time is spent until the fuel cell system stops after a driver turns off an ignition key, which is practically not preferable.

For solving the above problem, Japanese Patent Application Laid-Open No. 2002-313394 (=JP2002-313394) discloses a technology, wherein, when the fuel cell system is stopped, the fuel cell is dried with a reactive gas dried with a dehumidifier provided for removing moisture from the reactive gas by dehumidifying the reactive gas.

In addition, as a like technology, Japanese Patent Application Laid-Open No. 2002-208421 (=JP2002-208421) discloses a technology of drying a fuel cell by supplying to the fuel cell a dry air heated to a high temperature.

In addition, Japanese Patent Application Laid-Open No. 2002-246054 (=JP2002-246054) discloses a technology, wherein a coolant for cooling the fuel cell during operation is heated at the stop of the fuel cell such that the thus heated coolant heats up the fuel cell to a certain temperature, thereby drying the fuel cell.

The above technologies increase the reactive gas temperature or the fuel cell temperature, thereby evaporating and removing the moisture in the fuel cell.

DISCLOSURE OF THE INVENTION

However, according to the technology in JP2002-208421 for drying the fuel cell with the dry air heated to the high temperature, heat capacity of the dry air is far smaller than heat capacity of a manifold member for distributing or collecting reactive gas to each fuel cell or heat capacity of a separator member of the fuel cell. Therefore, no matter how high the dry air is heated up to be supplied to the fuel cell, the dry air will be considerably decreased in temperature when reaching close to the passage and electrode which are to be dried inherently by the high temperature dry air, thus remarkably decreasing an effect of vaporizing and removing the remaining moisture.

On the other hand, the technology in JP2002-246054 where the heated coolant is sent to the fuel cell for heating the fuel cell shows an effect of vaporizing and removing the remaining moisture without causing the above failure. On the contrary, however, a heater for heating the coolant is needed. Therefore, the fuel the cell system is enlarged and complicated. On top of that, time and power for heating the coolant are needed, thus increasing consumption power and requiring a long time for removing the moisture.

Therefore, in view of the above, it is an object of the present invention to provide a fuel cell system capable of decreasing time for removing the remaining moisture, without causing the consumption power increase and the structural enlargement or complication.

For accomplishing the above object, a fuel cell system according to the mode of the present invention is characterized by comprising: a controller; and a fuel cell connected to the controller and adapted to generate an electric power by electrically chemically reacting a fuel gas supplied via a fuel gas passage with an oxidizer gas supplied via an oxidizer gas passage, wherein when a stop of the fuel cell system is instructed, the controller makes the following operations: switching to a power generation condition for increasing a takeout quantity of a moisture generated in the fuel cell, continuing the power generation of the fuel cell for a certain time, stopping the power generation, and purging for a certain time the oxidizer gas passage of the fuel cell, or the oxidizer gas passage and fuel gas passage of the fuel cell.

According to the present invention, after the stop of the fuel cell is instructed, continuing the power generation by so switching the power generation as to increase the takeout quantity of the moisture from the fuel cell can move the moisture from the anode side to the cathode side, thus deviating the moisture to the cathode side. Then, after an elapse of the certain time, purging for the certain time at least the oxidizer gas passage can promptly remove the moisture deviated to the cathode side, thus making dry time of the fuel cell shorter than conventionally.

BRIEF DESCRIPTION OF THE DRAWINGS

FIG. 2(a) shows an operational characteristic, according to the first embodiment of the present invention; while FIG. 2(b) shows an operational characteristic, according to a conventional technology.

FIG. 3(a) shows an operational characteristic, according to a second embodiment of the present invention; while FIG. 3(b) shows the operational characteristic, according to the conventional technology.

FIG. 4(a) shows an operational characteristic, according to a third embodiment of the present invention; while FIG. 4(b) shows the operational characteristic, according to the conventional technology.

FIG. 10(a) shows an operational characteristic, according to an eighth embodiment of the present invention; while FIG. 10(b) shows the operational characteristic, according to the conventional technology.

FIG. 13 shows an operational characteristic, according to a tenth embodiment of the present invention.

BEST MODE FOR CARRYING OUT THE INVENTION

Hereinafter, the best mode for carrying out the invention is to be explained referring to drawings.

First Embodiment

Figure 1:
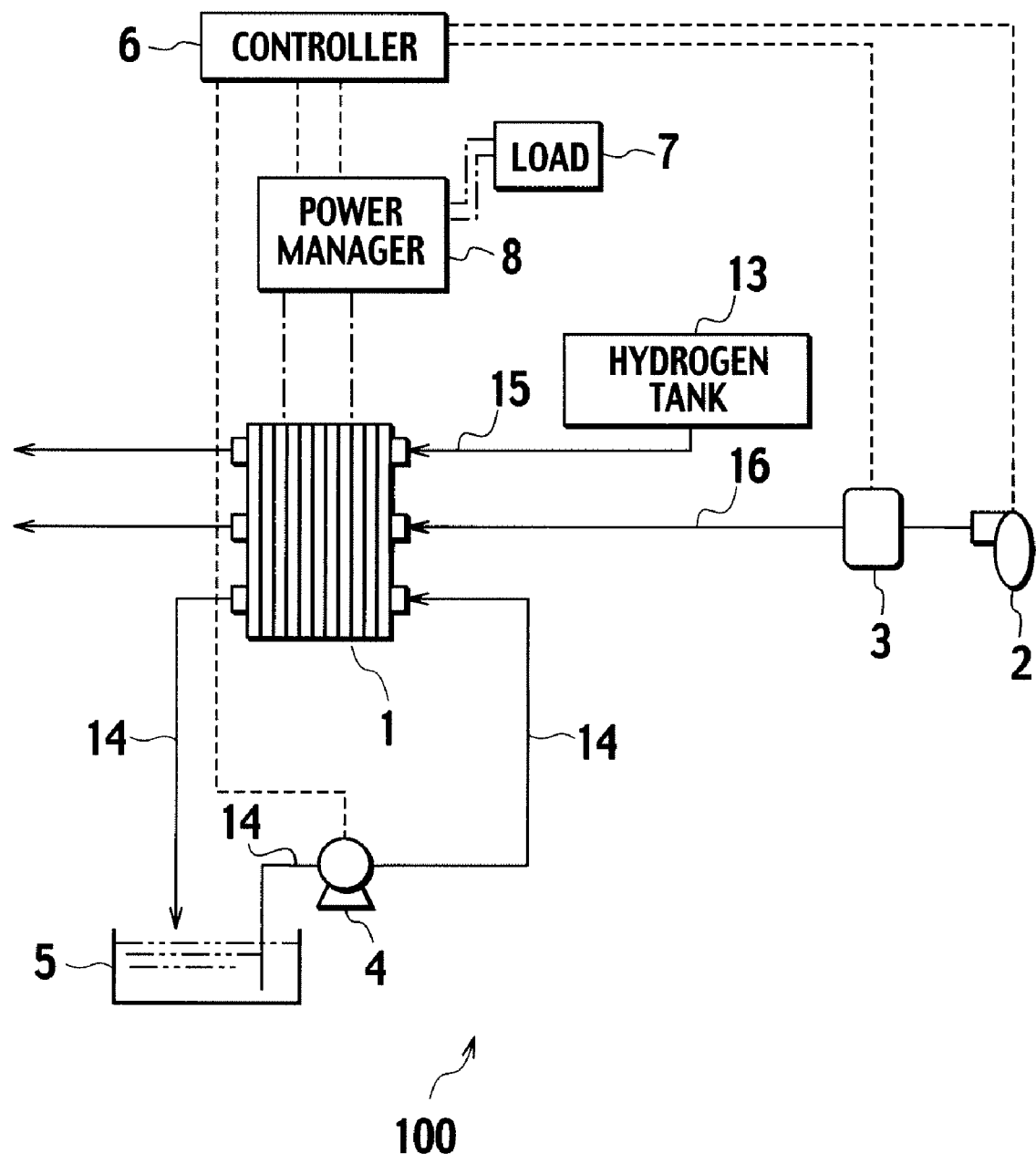
FIG. 1 shows a structure of a fuel cell system, according to a first embodiment of the present invention.

FIG. 1 shows a structure of a fuel cell system 100, according to a first embodiment of the present invention. The fuel cell system 100 shown in FIG. 1 according to the first embodiment is provided with a fuel cell stack 1, a cathode reactive gas supplier 2, a humidifier 3, a coolant circulator 4, a coolant tank 5, a controller 6, a load 7 and a power manager 8.

A plurality of unit fuel cells are stacked in the fuel cell stack 1 where a chemical reaction between hydrogen of fuel gas and air of oxidizer gas generates an electric power. The hydrogen is supplied from a hydrogen tank 13 to the fuel cell stack 1, while the air is supplied from the cathode reactive gas supplier 2 to the fuel cell stack 1. An electric power generated by the fuel cell stack 1 is taken out of the fuel cell stack 1, and then is supplied to a load 7, a secondary battery 10 (to be described afterward), an auxiliary unit (to be described afterward), and the like.

The cathode reactive gas supplier 2 includes a compressor and the like for compressing the air as a cathode reactive gas and supplies the thus compressed air to the fuel cell stack 1.

The humidifier 3 humidifies the air supplied from the cathode reactive gas supplier 2 to the fuel cell stack 1.

By way of a coolant passage 14 connecting the fuel cell stack 1 to the coolant circulator 4 and coolant tank 5, the coolant circulator 4 circulatively supplies to the fuel cell stack 1 a coolant stored in the coolant tank 5, thereby removing heat generated by the power generation of the fuel cell stack 1. With this, the coolant circulator 4 includes a pump and the like distributing the coolant.

The load 7 consumes the electric power given from the fuel cell stack 1. When the fuel cell system 100 is installed, for example, to a vehicle, the load 7 includes an electric motor and the like.

The power manager 8 manages taking-out of the electric power generated by the fuel cell stack 1, and controls connection between the fuel cell stack 1 and the load 7.

The controller 6 functions as a control center for controlling operation of the fuel cell system 100, and is a microcomputer and the like provided with sources such as CPU, memory, input-output unit and the like which are necessary for a computer for controlling various operations based on a program. The controller 6 reads in signals from various sensors (not shown) of the fuel cell system 100. Based on the thus read-in various signals and on a control logic (program) kept inside in advance, the controller 6 sends instructions to each of structural elements of the fuel cell system 100 which elements including the fuel cell stack 1, the cathode reactive gas supplier 2, the humidifier 3, the coolant circulator 4, the load 7 and the power manager 8. Thereby, the controller 6 administratively controls all operations (including removing of remaining moisture, as described below) that are necessary for driving/stopping the fuel cell system 100.

With the above structure, turning on a trigger for stopping the fuel cell system 100 makes a stop instruction, then, a so-far power generation of the fuel cell stack 1 is so switched as to increase a takeout quantity Qm of the moisture generated in the fuel cell stack 1. Namely, the controller 6 so controls the humidifier 3 as to decrease an air humidifying quantity, while keeping for a certain time Pg the power generation of the fuel cell stack 1. After an elapse of the certain time Pg, the controller 6 so controls the power manager 8 as to separate the load 7 from the fuel cell stack 1, to thereby stop the power generation of the fuel cell stack 1. Meanwhile, the controller operates for a certain time Pp the cathode reactive gas supplier 2 for purging, to thereby supply the air to the fuel cell stack 1. After the certain time Pp, the controller 6 stops the cathode reactive gas supplier 2, to thereby stop supplying the air to the fuel cell stack 1.

Changes of load, air humidifying quantity, takeout quantity Qm of the moisture of the fuel cell stack 1, and membrane resistance of electrolyte membrane of the fuel cell stack 1, relative to an elapse of time are shown in FIG. 2(a) according to the first embodiment and in FIG. 2(b) according to the conventional technology which does not adopt the technology according to the present invention. Referring to FIG. 2(a) according to the first embodiment, turning on the trigger for stopping the fuel cell system 100 (stop instruction) supplies to the fuel cell stack 1 the air having humidifying quantity thereof lower than an optimum humidifying quantity for smoothly implementing a normal power generation. With this, the takeout quantity Qm of the moisture of the fuel cell stack 1 is increased, thereby increasing the membrane resistance. In addition, it is commonly known that one proton moving through a high molecule membrane of electrolyte membrane in the power generation of the fuel cell stack 1 drags 1 to 2.5 molecules of moisture (proton drag).

Figure 2:
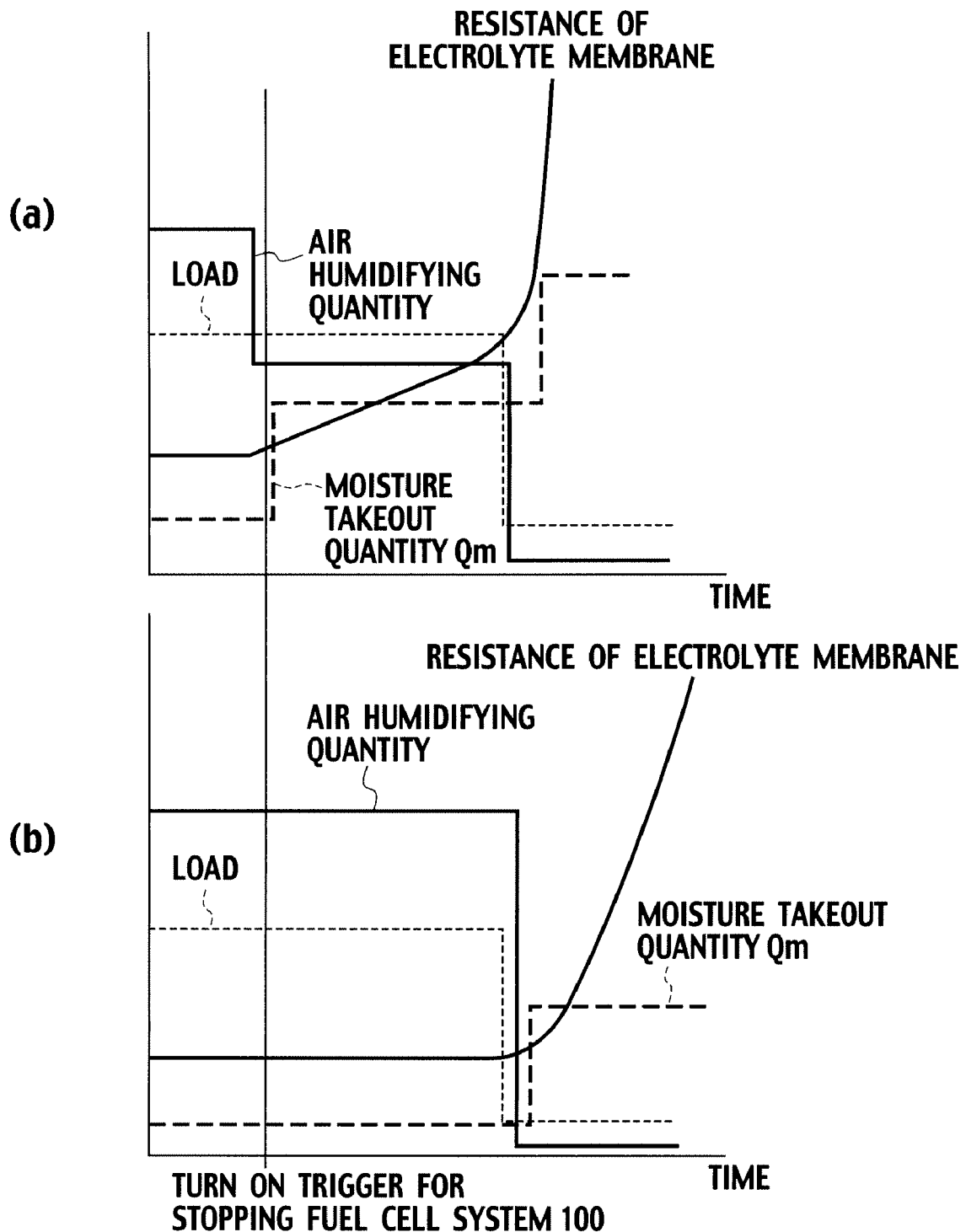

With this, continuing the power generation with the air having low humidify moves the moisture from an anode side to a cathode side, thereby collecting the moisture to the cathode side. Therefore, purging the cathode side with the air for the certain time Pp after stopping the power generation of the fuel cell stack 1 at the low humidify can take out more moisture, and, as shown in FIG. 2(*a*), thereby rapidly increasing the membrane resistance of the fuel cell stack 1.

With this, in a comparatively short time, the electrolyte membrane can have dryness necessary for an icing point start. When the fuel cell stack 1 is used as a power source for driving, for example, a vehicle, it is desired that the fuel cell system 100 should stop as soon as possible after a driver turns off an ignition key of the vehicle, which can be accomplished by the technology according to the first embodiment.

According to the first embodiment, after the trigger for stopping the fuel cell system 100 is turned on (after stop instruction), continuing the power generation by so switching the power generation as to increase the takeout quantity Qm of the moisture from the fuel cell stack 1, namely, as to decrease the air humidifying quantity can move the moisture from the anode side to the cathode side (electric filter moisture), deviating the moisture to the cathode side. Then, after an elapse of the certain time Pg, separating the load 7 to thereby stop the power generation, and purging the cathode side with the air for the certain time Pp can promptly remove the moisture deviated to the cathode side, thus making dry time of the fuel cell stack 1 shorter than the conventional method.

Second Embodiment

Then, a second embodiment of the present invention is to be explained. Changes of load, temperature of fuel cell, takeout quantity Qm of the moisture of the fuel cell stack 1, and membrane resistance of electrolyte membrane of the fuel cell stack 1, relative to an elapse of time are shown in FIG. 3(*a*) according to the second embodiment and in FIG. 3(*b*) according to the conventional technology.

Compared with the first embodiment, the following control is implemented after the trigger for stopping the fuel cell system 100 is turned on (after stop instruction) according to the second embodiment. For increasing the takeout quantity Qm of the moisture generated in the fuel cell stack 1, the so-far power generation of the fuel cell stack 1 is continued for the certain time Pg by increasing the load 7, instead of by decreasing the air humidifying quantity. Other features according to the second embodiment are like those according to the first embodiment. The controller 6 in FIG. 1 controlling the power manager 8 can implement the above control.

Figure 3:
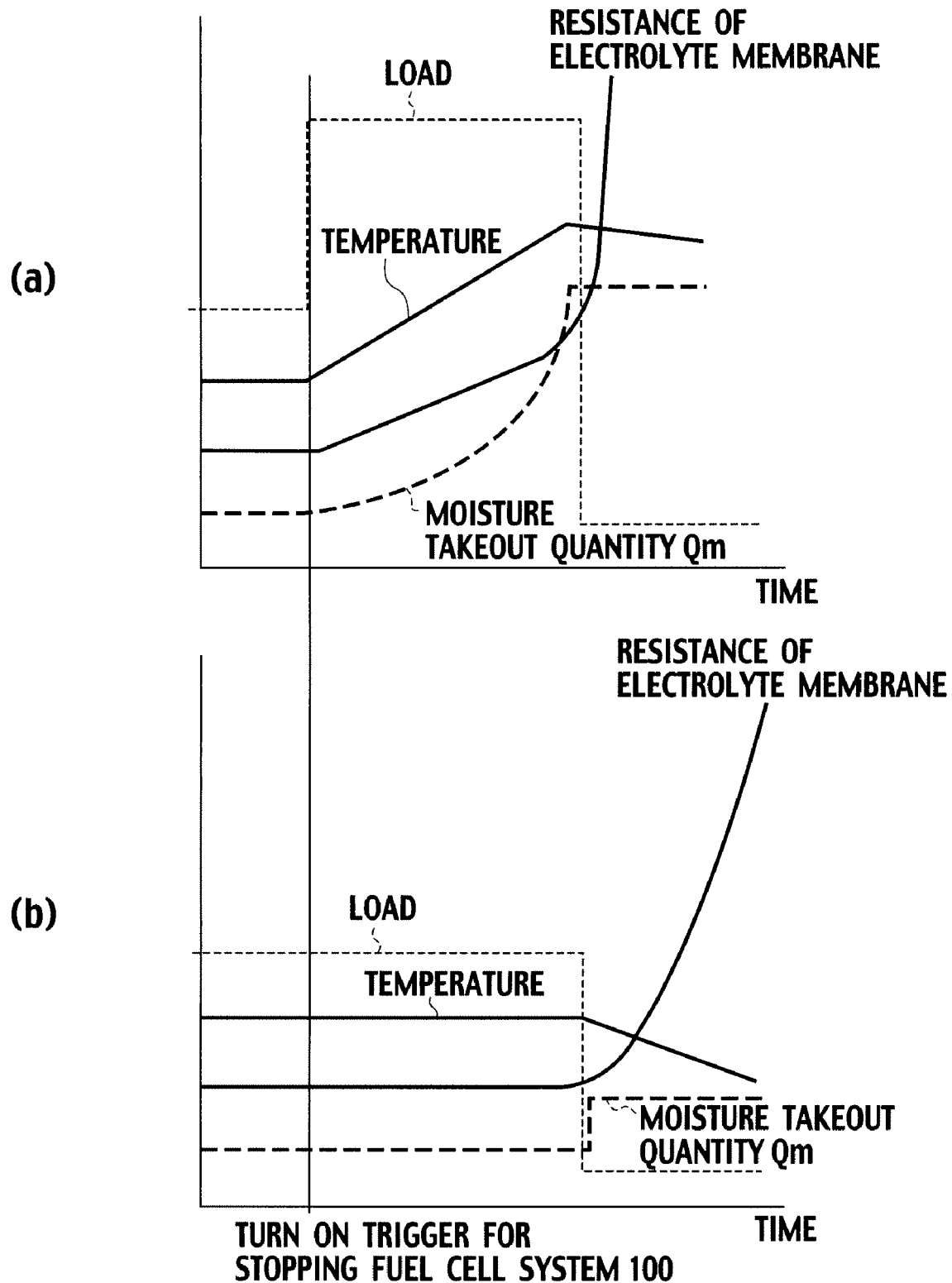

With the above control, as shown in FIG. 3(*a*), in a load operation after the trigger for stopping the fuel cell system 100 is turned on (after stop instruction), a catalyst layer (not shown) of the fuel cell becomes more exothermic, thus increasing saturated vapor pressure near the catalyst layer. With this, stopping the power generation by separating the load 7 and then purging the cathode with the air for the certain time Pp can remove more moisture through the vaporization. Therefore, as shown in FIG. 3(*a*), the load operation after the trigger for stopping the fuel cell system 100 is turned on (after stop instruction) can increase the takeout quantity Qm of the moisture, and the purging after the load 7 being separated can exhaust more moisture, thereby rapidly increasing the membrane resistance of the electrolyte membrane of the fuel cell stack 1. With this, like the first embodiment, the second embodiment allows the electrolyte membrane to have in a short time the dryness necessary for the icing point start.

As described above, according to the second embodiment, after the trigger for stopping the fuel cell system 100 is turned on (after stop instruction), continuing the power generation for the certain time Pg with the load 7 larger than that immediately before stopping the power generation can generate more exothermic quantity than when the load is small. With this, the saturated vapor pressure near the catalyst layer in the purging for the certain time Pp is increased, thus removing more moisture in a short time.

Third Embodiment

Figure 4:
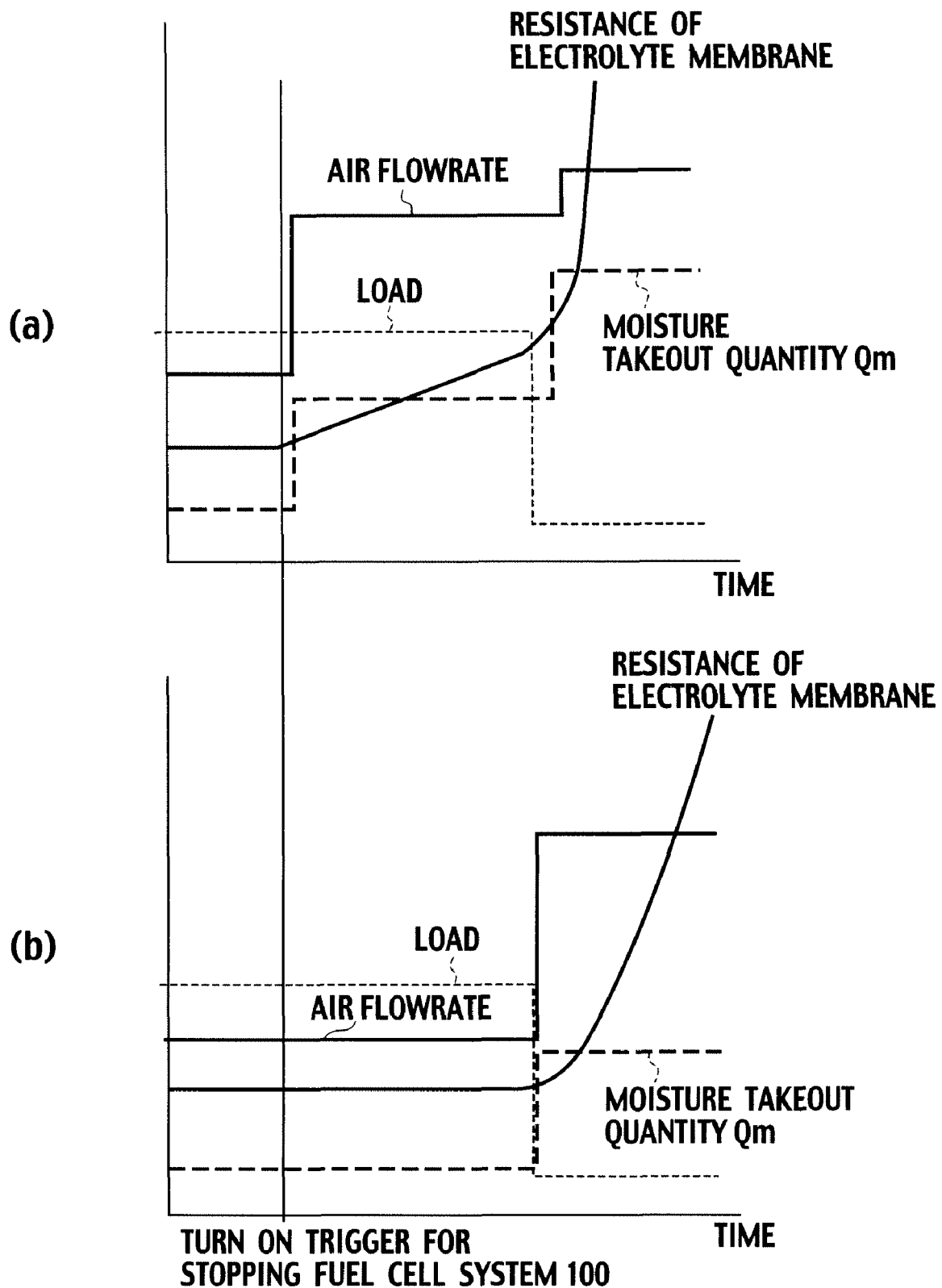

Then, a third embodiment of the present invention is to be explained. Changes of load, air flowrate, takeout quantity Qm of the moisture of the fuel cell stack 1, and membrane resistance of electrolyte membrane of the fuel cell stack 1, relative to an elapse of time are shown in FIG. 4(*a*) according to the third embodiment and in FIG. 4(*b*) according to the conventional technology.

Compared with the first embodiment, the following control is implemented after the trigger for stopping the fuel cell system 100 is turned on (after stop instruction) according to the third embodiment. For increasing the takeout quantity Qm of the moisture in the fuel cell stack 1, the so-far power generation of the fuel cell stack 1 is continued for the certain time Pg by increasing the air flowrate, instead of by decreasing the air humidifying quantity. In other words, the power generation of the fuel cell stack 1 is implemented for the certain time Pg by lowering power generation efficiency. Other features according to the third embodiment are like those according to the first embodiment. The controller 6 in FIG. 1 controlling the cathode reactive gas supplier 2 can implement the above control.

With the above control, after the trigger for stopping the fuel cell system 100 is turned on (after stop instruction), the fuel cell stack 1 implements the load operation at a low utilization ratio, thus increasing the takeout quantity Qm of the moisture. With this, the above proton drag phenomenon can collect to the cathode side the moisture in the electrolyte membrane.

For increasing the takeout quantity Qm of the moisture in the low utilization ratio operation, however, it is necessary that relative humidity of the air is equivalent or less. However, increasing the air flowrate with the same humidifier 3 generally lowers the humidify, therefore meeting the above necessity with ease. Therefore, according to the third embodiment, the moisture collected to the cathode side like the first embodiment is promptly exhausted by the purging for the certain time Pp after the power generation stop. With this, the electrolyte membrane can have in a comparatively short time the dryness necessary for the icing point start.

As described above, according to the third embodiment, after the trigger for stopping the fuel cell system 100 is turned on (after stop instruction), continuing the power generation for the certain time Pg at the utilization ratio lower than that in the normal power generation can increase the takeout quantity Qm of the moisture, thus more efficiently deviating the moisture to the cathode side. With this, the third embodiment can bring about the effect like that bought about by the first embodiment.

Fourth Embodiment

Figure 5:
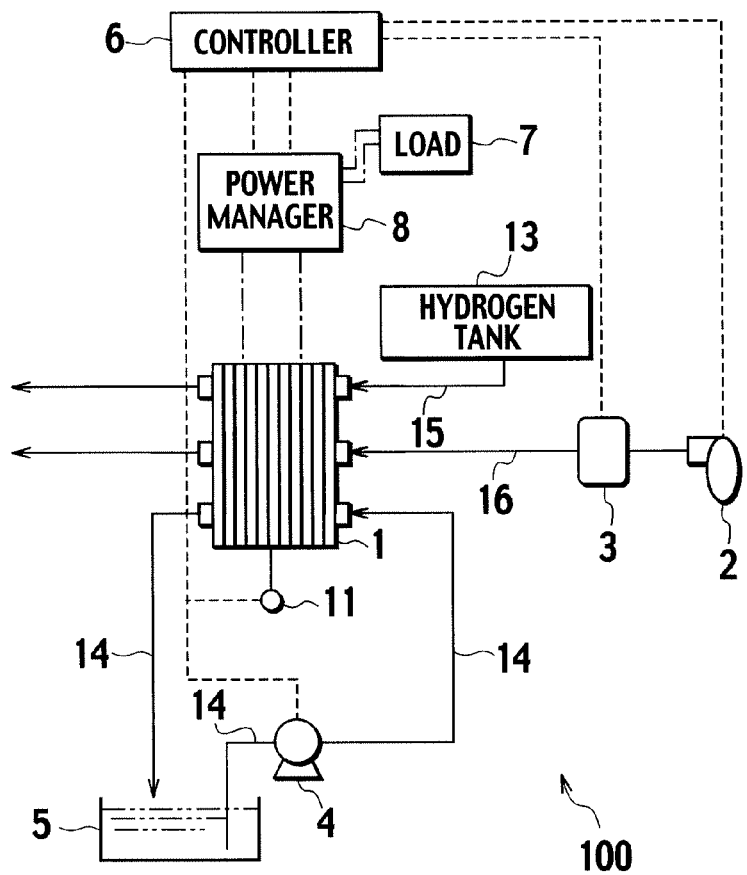
FIG. 5 shows a structure of the fuel cell system 100, according to a fourth embodiment of the present invention.

FIG. 5 shows a structure of the fuel cell system 100, according to a fourth embodiment of the present invention.

Compared with the first embodiment in FIG. 1, the fuel cell stack 1 of the fuel cell system 100 in FIG. 5 according to the fourth embodiment is provided with a temperature monitor 11 for monitoring a typical temperature of the fuel cell stack 1. Based on the thus monitored temperature T, the process according to any one of the first embodiment to the third embodiment can remove the moisture. Other features according to the fourth embodiment are like those according to the first embodiment to the third embodiment.

Figure 6:
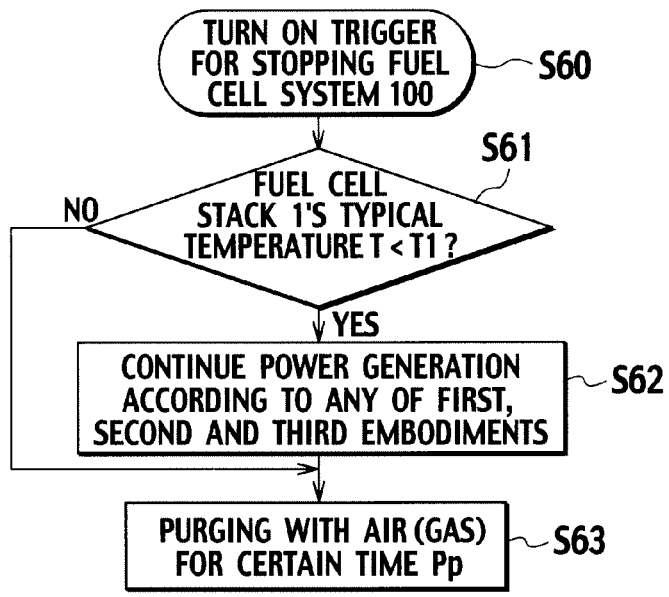
FIG. 6 is a flow chart showing an operation procedure, according to the fourth embodiment of the present invention.

Then, control procedure according to the fourth embodiment is to be explained, referring to a flow chart in FIG. 6. At first, with the trigger for stopping the fuel cell system 100 turned on (S60: stop instruction) in FIG. 6, the typical temperature T of the fuel cell stack 11 is monitored with the temperature monitor 11. Then, the routine senses whether the thus monitored typical temperature T is a certain temperature T1 or more (S61).

When T≧T1 after the sensing, the routine skips continuing the power generation of the fuel cell stack 1 according to the first embodiment to the third embodiment (S62), and immediately implements the process of purging inside the fuel cell stack 1 with the air for the certain time Pp (S63). As described above, at the high temperature of fuel cell stack 1 (T≧T1), simply purging the inside of the fuel cell stack 1 like the conventional technology can remove much moisture through the vaporization in a short time.

On the contrary, at a low temperature of fuel cell stack 1 (T<T1), the conventional technology may take a long time for the purging, making it difficult to remove the moisture in a short time. Therefore, with the typical temperature T<T1, the method according to any one of the first embodiment to the third embodiment is used for continuing for the certain time Pg the power generation of the fuel cell stack 1, to thereafter purge for the certain time Pp the inside of the fuel cell stack 1 with the air. With this, even with T<T1, the electrolyte membrane can have in a comparatively short time the dryness necessary for the icing point start.

According to the fourth embodiment as described above, based on the typical temperature T, the process according to any one of the first embodiment to the third embodiment is implemented or the above process is not implemented, thus implementing an optimum dry purging without consuming a wasteful energy.

Fifth Embodiment

Figure 7:
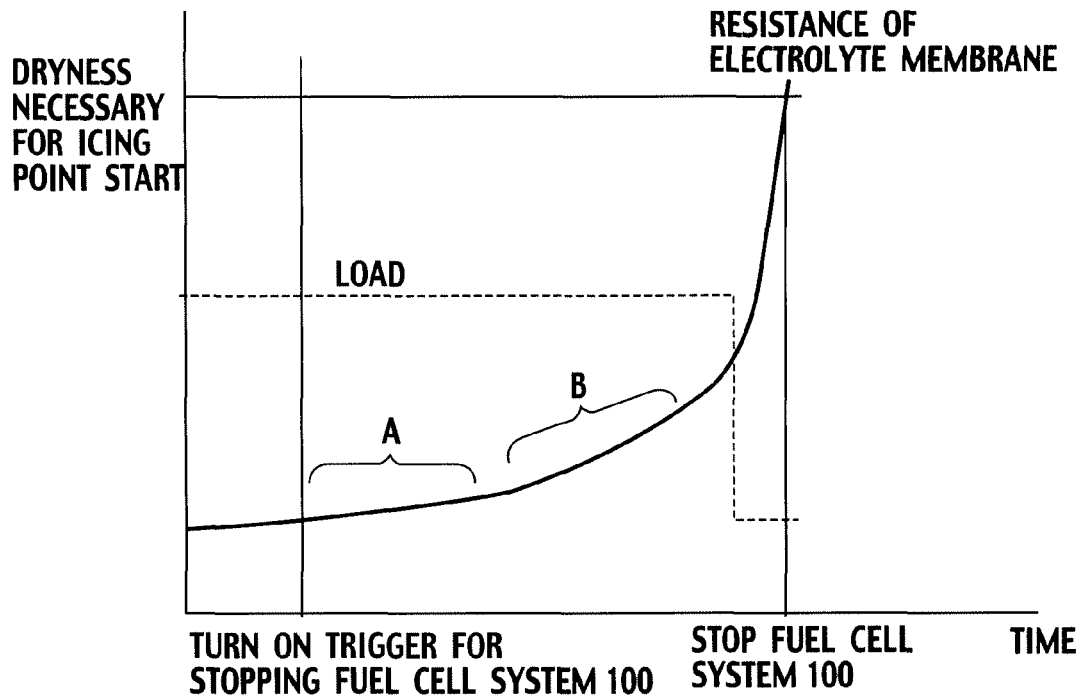
FIG. 7 shows an operational characteristic, according to a fifth embodiment of the present invention.

Then, a fifth embodiment of the present invention is to be explained, referring to FIG. 7. FIG. 7 shows changes of load 7 and membrane resistance of electrolyte membrane of the fuel cell stack 1, relative to an elapse of time.

According to the fourth embodiment, when the typical temperature T monitored with the temperature monitor 11 is lower than the certain temperature T1 (T<T1), it is presumed that continuing the power generation of the fuel cell stack 1 by the control methods according to the first embodiment to the third embodiment cannot rapidly increase the resistance of the electrolyte membrane. Then, according to the fifth embodiment, as shown in FIG. 7, with the low typical temperature T (T<T1), the power generation of the fuel cell stack 1 is continued for a certain time PgL, which is longer than the certain time Pg according to the fourth embodiment, until the membrane resistance of the fuel cell stack 1 is increased to a certain value. Then, like the first embodiment to the third embodiment, the load 7 is separated, to thereafter purge the cathode side for the certain time Pp, thus allowing the electrolyte membrane to have the dryness necessary for the icing point start. "A" in FIG. 7 denotes: Low temperature (T<T1) causing small resistance increase. "B" in FIG. 7 denotes: Power generation for certain time PgL (longer) increasing resistance in the latter half.

As described above, according to the fifth embodiment, the certain time Pg for continuing the power generation of the fuel cell stack 1 is controlled based on the typical temperature T. Therefore, with the fuel cell system 100 stopped at the comparatively low temperature (T<T1), increasing the temperature through the power generation for the certain time PgL (longer) can remove more moisture. On the contrary, with the fuel cell system 100 stopped at the comparatively high temperature (T≧T1), the power generation for a certain time PgS (shorter) can implement an optimum dry purge without consuming a wasteful energy.

Sixth Embodiment

Figure 8:
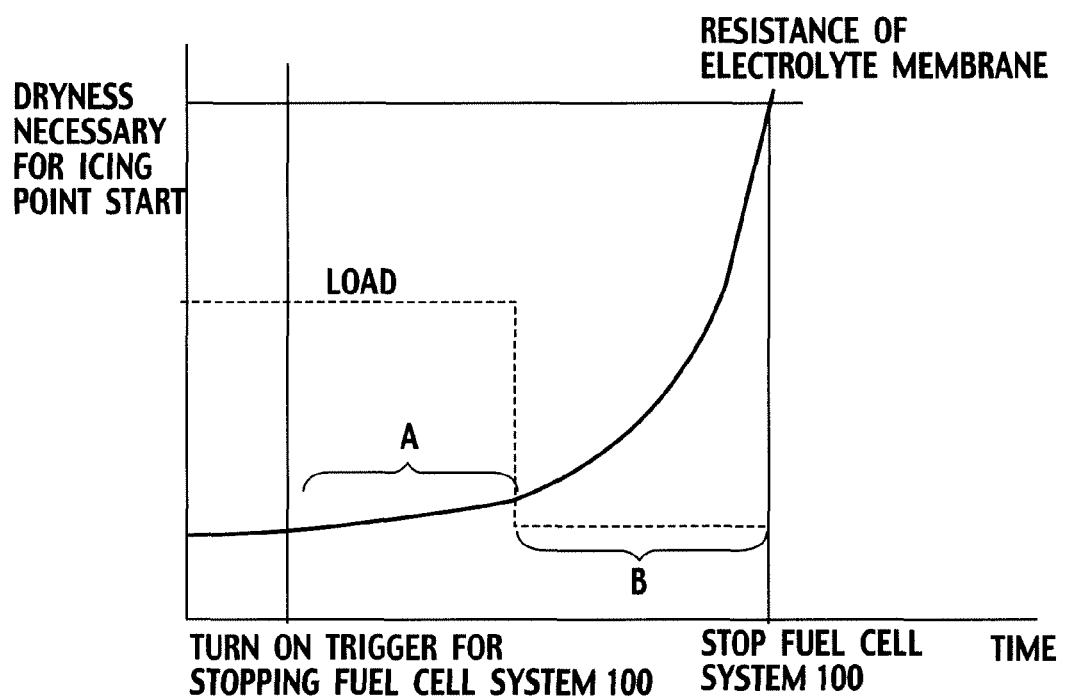
FIG. 8 shows an operational characteristic, according to a sixth embodiment of the present invention.

Then, a sixth embodiment of the present invention is to be explained, referring to FIG. 8. FIG. 8 shows changes of load and membrane resistance of electrolyte membrane of the fuel cell stack 1, relative to an elapse of time.

According to the fourth embodiment, when the typical temperature T monitored with the temperature monitor 11 is lower than the certain temperature T1 (T<T1), it is presumed that continuing the power generation of the fuel cell stack 1 by the control methods according to the first embodiment to the third embodiment cannot rapidly increase the resistance of the electrolyte membrane. Then, according to the sixth embodiment, as shown in FIG. 8, with the typical temperature T lower than the certain temperature (T<T1), after the load 7 is separated from the fuel cell stack 1, the cathode is purged for a certain time PpL which is longer than the certain time Pp according to the fourth embodiment, thus allowing the electrolyte membrane to have the dryness necessary for the icing point start.

As described above, according to the sixth embodiment, the certain time Pp for the purging after separating the load 7 is controlled based on the typical temperature T of the fuel cell stack 1. Therefore, with the fuel cell system 100 stopped at the comparatively low temperature (T<T1) causing a small amount of the vaporized moisture, purging the moisture for the certain time PpL (longer) removes the moisture. On the other hand, with the fuel cell system 100 stopped at the comparatively high temperature (T≧T1), purging the moisture for the certain time PpS (shorter) can accomplish the optimum dry purge without consuming a wasteful energy. "A" in FIG. 8 denotes: Low temperature (T<T1) causing small resistance increase. "B" in FIG. 8 denotes: Purging for certain time PpL (longer) increasing resistance in the latter half.

Seventh Embodiment

Figure 9:
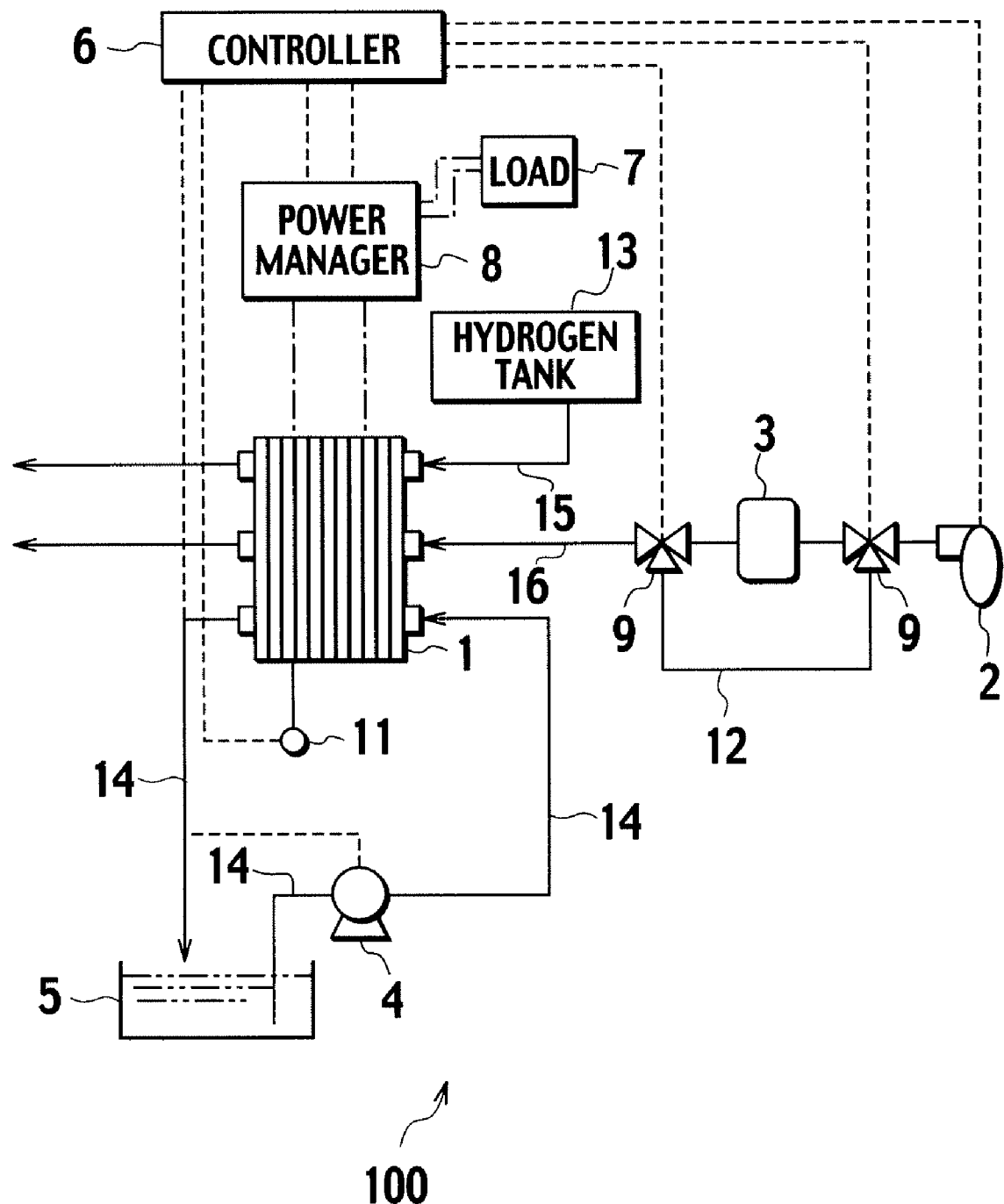
FIG. 9 shows a structure of the fuel cell system, according to a seventh embodiment of the present invention.

FIG. 9 shows a structure of the fuel cell system 100, according to a seventh embodiment of the present invention. Compared with the fourth embodiment in FIG. 5, the fuel cell stack 1 of the fuel cell system 100 in FIG. 9 according to the seventh embodiment is provided with a bypass line 12 for allowing the air exhausted from the cathode reactive gas supplier 2 to bypass the humidifier 3 in parallel to the humidifier 3 and a pair of 3-way valves 9 disposed respectively on upstream and downstream of the humidifier 3. The controller 6 switchably controls the 3-way valves 9, thus selectively setting air passages (oxidizer gas passage 16) on the humidifier 3 side or the bypass line 12 side. Other features according to the seventh embodiment in FIG. 9 are like those according to the fourth embodiment in FIG. 5.

According to the first embodiment, after the trigger for stopping the fuel cell system 100 is turned on (after stop instruction), the humidifier 3 is so controlled as to decrease the air humidifying quantity, thereby continuing the power generation of the fuel cell stack 1. According to the seventh embodiment, however, after the trigger for stopping the fuel cell system 100 is turned on (after stop instruction), the 3-way valve 9 is switched to the bypass line 12 side to thereby allow the air to bypass the humidifier 3 to be supplied to the fuel cell stack 1.

With this, compared with the first embodiment, the seventh embodiment achieves more takeout quantity Qm of moisture from the fuel cell stack 1, thus allowing the electrolyte membrane to have in a shorter time the dryness necessary for the icing point start. In addition, after the trigger for stopping the fuel cell system 100 is turned on (stop instruction) and the control method of any of the first embodiment to the third embodiment is used for the power generation, the purging is implemented on the cathode side with the air bypassing the humidifier 3, according to the seventh embodiment. With this, compared with when using the air through the humidifier 3, the electrolyte membrane according to the seventh embodiment can have in a shorter time the dryness necessary for the icing point start.

As described above, according to the seventh embodiment, the air supplied after the trigger for stopping the fuel cell system 100 is turned on (after stop instruction) bypasses the humidifier 3 and therefore is dry, thus promoting dryness of the electrolyte membrane and of a catalyst layer during the power generation continued for the certain time Pg, to thereby more decrease an entire drying time.

Eighth Embodiment

Figure 10:
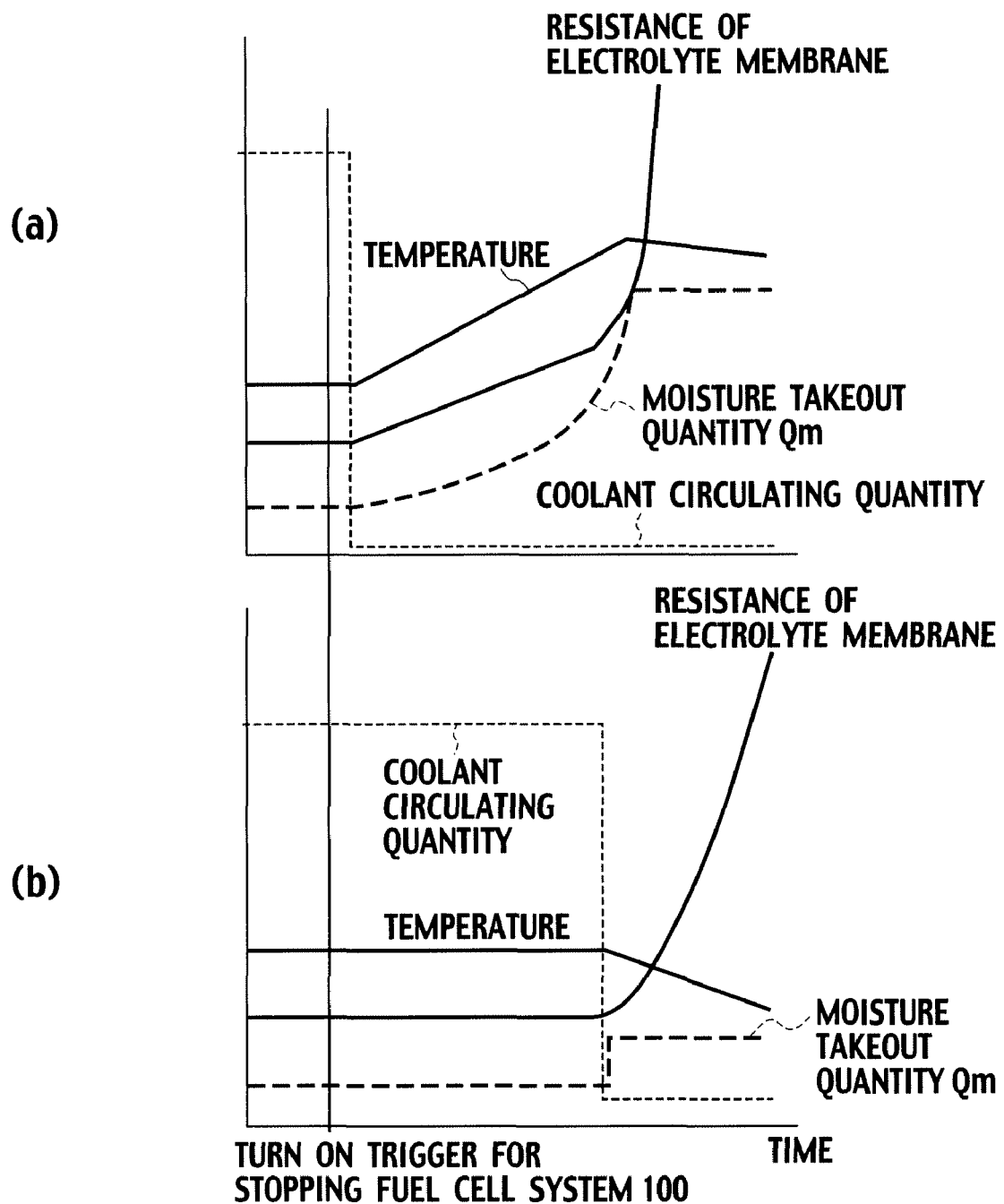

Then, an eighth embodiment of the present invention is to be explained, referring to FIG. 10(a) and FIG. 10(b). Changes of coolant circulating quantity, typical temperature T of the fuel cell stack 1, takeout quantity Qm of the moisture of the fuel cell stack 1, and membrane resistance of electrolyte membrane of the fuel cell stack 1, relative to an elapse of time are shown in FIG. 10(a) according to the second embodiment and in FIG. 10(b) according to the conventional technology.

According to the eighth embodiment, turning on the trigger for stopping fuel cell system 100 (stop instruction) with the structure in any of FIG. 1, FIG. 5 and FIG. 9 stops the coolant circulator 4, thus stopping circulation of the coolant. Then, the control method according to any of the first embodiment to the third embodiment continues the power generation of the fuel cell stack 1 for the certain time Pg. Stopping the circulation of the coolant, as shown in FIG. 10(a), increases the temperature T of the fuel cell stack 1, to thereby increase the takeout quantity Qm of the moisture. With this, the electrolyte membrane can have in a short time the dryness necessary for the icing point start.

As described above, according to the eighth embodiment, after the trigger for stopping the fuel cell system 100 is turned on (after stop instruction), the power generation of the fuel cell stack 1 is continued for the certain time Pg with the circulation of the coolant stopped, thereby increasing the temperature T of the fuel cell stack 1 and making the dry time shorter.

Ninth Embodiment

Figure 11:
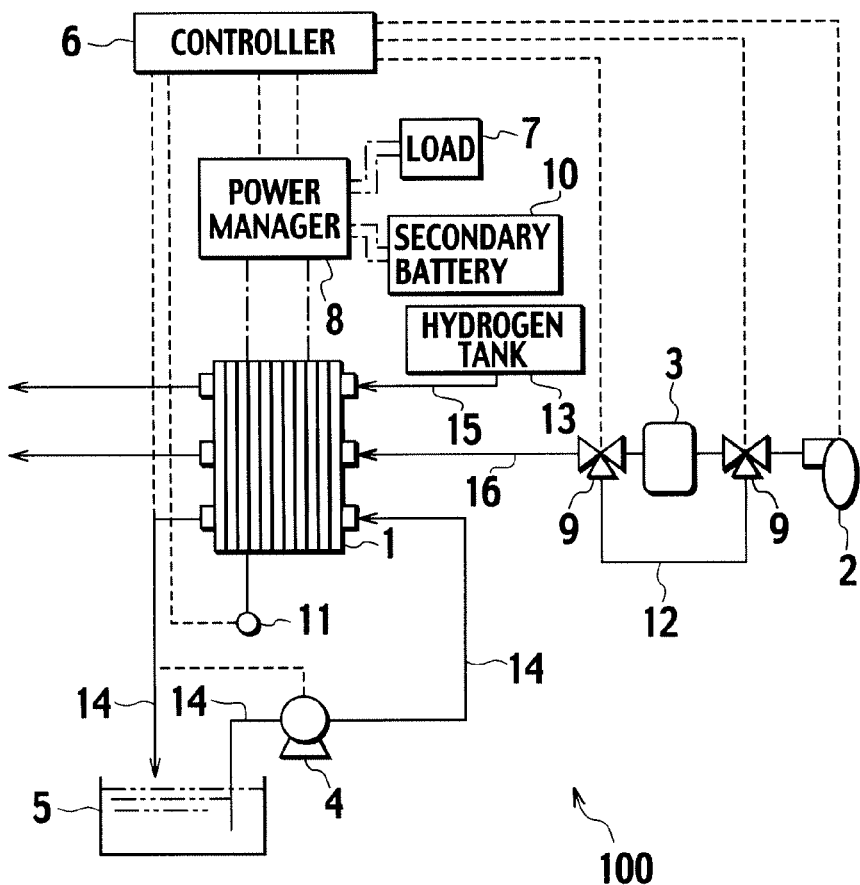
FIG. 11 shows a structure of the fuel cell system 100, according to a ninth embodiment of the present invention.

FIG. 11 shows a structure of the fuel cell system 100, according to a ninth embodiment of the present invention. The fuel cell system 100 according to the ninth embodiment shown in FIG. 11, compared with that of the seventh embodiment shown in FIG. 9, is provided with the secondary battery 10 for storing power obtained by the power generation in the fuel cell stack 1. Other features in FIG. 11 are like those in FIG. 9.

Figure 12:
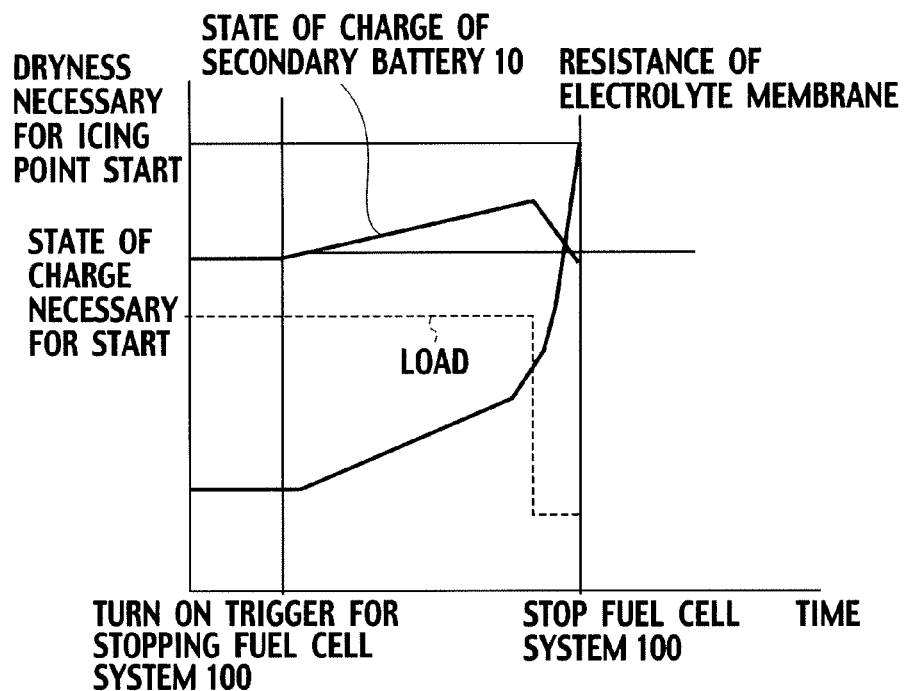
FIG. 12 shows an operational characteristic, according to the ninth embodiment of the present invention.

In the above structure, when the trigger for stopping the fuel cell system 100 (stop instruction) is turned on, the power generation of the fuel cell stack 1 continued at the so-far load 7, thus charging to the secondary battery 10 the power obtained by the above generation. Ordinarily, a state-of-charge SOC of the secondary battery 10 is stored and controlled in such a manner as to secure, in the next start of the fuel cell system 100, an electric power necessary for a driving force of the auxiliary unit. Therefore, after the trigger for stopping the fuel cell system 100 is turned on (after stop instruction), charging the power caused by the generation continued for the certain time Pg can make the state-of-charge SOC of the secondary battery 10 larger than a certain state-of-charge SOC1 necessary for starting the secondary battery 10, as shown in FIG. 12.

After the certain time Pg, the power generation of the fuel cell stack 1 stops and then the cathode reactive gas supplier 2 is operated using the power charged to the secondary battery 10 through the so-far generation, to thereafter purge for the certain time Pp with the air the cathode side of the fuel cell stack 1. With this, when the drying is completed and the fuel cell system 100 makes a complete stop, as shown in FIG. 12, the state-of-charge SOC of the secondary battery 10 again gets back to the certain state-of-charge SOC1, thereby preventing such a failure that the state-of-charge SOC of the secondary battery 10 is too short to make the next start.

As described above, according to the ninth embodiment, the electric power obtained by the generation continued for the certain time Pg after the trigger for stopping the fuel cell system 100 is turned on (after stop instruction) is charged to the secondary battery 10, and then the oxidizer gas passage 16 is purged with the air for the certain time Pp using the power stored in the secondary battery 10. With this, even when the fuel cell system 100 finally stops, the secondary battery 10 can continuously be kept in the certain state-of-charge SOC1, thus continuously securing the driving power source for the auxiliary unit in the next start.

Tenth Embodiment

Then, referring to FIG. 13, a tenth embodiment of the present invention is to be explained. Changes of load, state-of-charge SOC of the secondary battery 10, and membrane resistance of electrolyte membrane of the fuel cell stack 1, relative to an elapse of time are shown in FIG. 13.

Compared with the ninth embodiment, the feature of the tenth embodiment is applied to the following occasion: After the trigger for stopping the fuel cell system 100 is turned on (after stop instruction), the state-of-charge SOC of the secondary battery 10 fails to reach a state-of-charge SOC2 corresponding to an electric power which is an addition of a power necessary for purging the cathode side for the certain time Pp after separating the load 7, and a power (certain state-of-charge SOC1) necessary for the driving power source for the auxiliary unit in the next start of the fuel cell system 100. Other features according to the tenth embodiments are like those according to the ninth embodiment. In addition, the power necessary for purging the cathode side for the certain time Pp after separating the load 7, and the power (certain state-of-charge SOC1) necessary for the driving power source for the auxiliary unit in the next start are each calculated in advance through experiments, desk study and the like. Moreover, the state-of-charge SOC of the secondary battery 10 is controlled by the controller 6. Before the trigger for the fuel cell system 100 is turned on (before stop instruction), the controller 6 determining that the state-of-charge SOC of the secondary battery 10 measured by the controller 6 fails to satisfy the certain state-of-charge SOC1 necessary for start takes the following operations: As shown in FIG. 13(a), for example, increasing the load after the trigger for stopping the fuel cell system 100 is turned on (after stop instruction), and thereby storing in the secondary battery 10 an electric power more than that shown in FIG. 12 according to the ninth embodiment, thus so controlling as to accomplish the certain state-of-charge SOC1 when the fuel cell system 100 is stopped. Otherwise, instead of increasing the load, the certain time Pg for the generation is elongated so as to increase the state-of-charge SOC, to thereby increase the state-of-charge SOC of the secondary battery 10, thus so controlling as to accomplish the certain state-of-charge SOC1 when the fuel cell system 100 is stopped, as shown in FIG. 13(b).

Like the ninth embodiment, when the drying is completed and the fuel cell system 100 makes a complete stop, the state-of-charge SOC of the secondary battery 10 comes back again to the certain state-of-charge SOC1, as shown in any of FIG. 13(a) and FIG. 13(b), thereby preventing such a failure that the state-of-charge SOC of the secondary battery 10 is too short to make the next start.

According to the tenth embodiment as described above, the power generation of the fuel cell stack 1 implemented after the trigger for stopping the fuel cell system 100 is turned on (after stop instruction) is continued until the secondary battery 10 is charged with the electric power which is an addition of the power necessary for purging the cathode side for the certain time Pp after the load 7 is separated, and the power necessary for the driving power source for the auxiliary unit in the next start. Thereby, the secondary battery 10 can be continuously kept in the certain state-of-charge SOC1 even when the fuel cell system 100 finally stops, thereby continuously securing the driving power source for the auxiliary unit in the next start.

In addition, only the cathode side is purged according the first embodiment to the tenth embodiment. In addition to the cathode side, however, the anode side of the fuel cell stack 1 including the fuel gas passage 15 can be so configured as to be purged with the air, bringing about the like effect.

The entire content of the Japanese Patent Application No. 2004-343780 with its filing date of Nov. 29, 2004 in Japan is incorporated herein by reference.

Although the present invention has been described above by reference to certain embodiments, the present invention is not limited to the embodiments described above. Modifications and variations of the embodiments described above will occur to those skilled in the art, in light of the above teachings.

INDUSTRIAL APPLICABILITY

According to the present invention, after the stop of the fuel cell is instructed, continuing the power generation by so switching the power generation as to increase the takeout quantity of the moisture from the fuel cell can move the moisture from the anode side to the cathode side, thus deviating the moisture to the cathode side. Then, after an elapse of the certain time, purging for the certain time at least the oxidizer gas passage can promptly remove the moisture deviated to the cathode side, thus making dry time of the fuel cell shorter than conventionally.

The invention claimed is:

1. A fuel cell system, comprising:
a controller; and
a fuel cell connected to the controller and adapted to generate an electric power by power generation via electrically chemically reacting a fuel gas supplied via a fuel gas passage with an oxidizer gas supplied via an oxidizer gas passage,
wherein, after the fuel cell system is instructed to stop, the controller is configured to cause the following operations:
switching to a power generation condition for increasing a takeout quantity of a moisture generated in the fuel cell after the fuel cell system is instructed to stop,
continuing the power generation of the fuel cell for a first predetermined time under the power generation condition for increasing the takeout quantity of the moisture generated in the fuel cell after the switching to the power generation condition after the fuel cell system is instructed to stop,
stopping the power generation, wherein the stopping of the power generation is performed after the continuing of the power generation of the fuel cell, and
purging one of the oxidizer gas passage of the fuel cell and a combination of the oxidizer gas passage and the fuel gas passage of the fuel cell for a second predetermined time, wherein the purging is performed after the stopping of the power generation.

2. The fuel cell system according to claim 1, further comprising a humidifier configured to humidify the oxidizer gas supplied to the fuel cell,
wherein the controller is configured to switch to the power generation condition for increasing the takeout quantity of the moisture generated in the fuel cell after the fuel cell system is instructed to stop by having the oxidizer gas supplied to the fuel cell such that the oxidizer gas has a humidity quantity lower than a humidity quantity immediately before the fuel cell system is instructed to stop.

3. The fuel cell system according to claim 1, wherein the controller is configured to switch to the power generation condition for increasing the takeout quantity of the moisture generated in the fuel cell after the fuel cell system is instructed to stop by implementing the power generation at a load larger than a load immediately before the fuel cell system is instructed to stop.

4. The fuel cell system according to claim 1, wherein the controller is configured to switch to the power generation condition for increasing the takeout quantity of the moisture generated in the fuel cell after the fuel cell system is instructed to stop by implementing the power generation at a utilization ratio of the fuel cell lower than a utilization ratio immediately before the fuel cell system is instructed to stop.

5. The fuel cell system according to claim 2, wherein, after the fuel cell system is instructed to stop, the controller is configured to have the oxidizer gas supplied to the fuel cell without being humidified by the humidifier.

6. The fuel cell system according to claim 2, wherein the controller is configured to implement the purging by supplying the oxidizer gas without being humidified by the humidifier.

7. The fuel cell system according to claim 1, further comprising a temperature monitor configured to monitor a temperature of the fuel cell, and wherein, after the fuel cell system is instructed to stop and with the temperature monitored by the temperature monitor being less than a certain temperature, the controller is configured to cause the following operations:
continuing the power generation of the fuel cell for the first predetermined time after the fuel cell system is instructed to stop,
stopping the power generation, and
purging the one of the oxidizer gas passage of the fuel cell and the combination of the oxidizer gas passage and the fuel gas passage of the fuel cell for the second predetermined time.

8. The fuel cell system according to claim 1, further comprising a temperature monitor configured to monitor a temperature of the fuel cell, wherein, after the fuel cell system is instructed to stop, the controller is configured to set the first predetermined time for continuing the power generation of the fuel cell based on the temperature monitored by the temperature monitor.

9. The fuel cell system according to claim 1, further comprising a temperature monitor configured to monitor a temperature of the fuel cell, wherein, after the fuel cell system is instructed to stop, the controller is configured to set the second predetermined time for purging the one of the oxidizer gas passage of the fuel cell and the combination of the oxidizer gas passage and the fuel gas passage of the fuel cell based on the temperature monitored by the temperature monitor.

10. The fuel cell system according to claim 1, further comprising a cooler configured to distribute a coolant to the fuel cell such that a heat generated by the power generation is removed,
  wherein, after the fuel cell system is instructed to stop, the controller is configured to stop distribution of the coolant by the cooler.

11. The fuel cell system according to claim 1, further comprising a power storer configured to store the power obtained by the power generation of the fuel cell, and wherein, after the fuel cell system is instructed to stop, the controller is configured to cause the following operations:
  storing in the power storer power obtained by the power generation continued for the first predetermined time after the fuel cell system is instructed to stop, and
  purging the one of the oxidizer gas passage of the fuel cell and the combination of the oxidizer gas passage and the fuel gas passage of the fuel cell using the power stored in the power storer.

12. The fuel cell system according to claim 1, further comprising a power storer configured to store the power obtained by the power generation of the fuel cell,
  wherein, after the fuel cell system is instructed to stop, the controller is configured to continue the power generation of the fuel cell until a first power, which is a sum of a second power necessary for the purging for the second predetermined time and a third power necessary for a next start of the fuel cell system, is stored in the power storer.

13. The fuel cell system according to claim 5, wherein, after the fuel cell system is instructed to stop, the controller is configured to supply the oxidizer gas to the fuel cell using a 3-way valve and a bypass line.

14. A method of controlling a fuel cell system which includes a controller, and a fuel cell connected to the controller and adapted to generate an electric power by power generation via electrically chemically reacting a fuel gas supplied via a fuel gas passage with an oxidizer gas supplied via an oxidizer gas passage,
  wherein, after the fuel cell system is instructed to stop, the method comprises:
    switching to a power generation condition for increasing a takeout quantity of a moisture generated in the fuel cell after the fuel cell system is instructed to stop;
    continuing the power generation of the fuel cell for a first predetermined time under the power generation condition for increasing the takeout quantity of the moisture generated in the fuel cell after the switching to the power generation condition after the fuel cell system is instructed to stop;
    stopping the power generation, wherein the stopping of the power generation is performed after the continuing of the power generation of the fuel cell; and
    purging one of the oxidizer gas passage of the fuel cell and a combination of the oxidizer gas passage and the fuel gas passage of the fuel cell for a second predetermined time, wherein the purging is performed after the stopping of the power generation.

15. A fuel cell system, comprising:
  a fuel cell for generating an electric power by power generation via electrically chemically reacting a fuel gas with an oxidizer gas;
  a fuel gas passing means for supplying the fuel gas to the fuel cell;
  a oxidizer gas passing means for supplying the oxidizer gas to the fuel cell; and
  a controlling means for controlling the fuel cell, the fuel gas passing means and the oxidizer gas passing means,
  wherein, after the fuel cell system is instructed to stop, the controlling means causes the following operations:
    switching to a power generation condition for increasing a takeout quantity of a moisture generated in the fuel cell after the fuel cell system is instructed to stop,
    continuing the power generation of the fuel cell for a first predetermined time under the power generation condition for increasing the takeout quantity of the moisture generated in the fuel cell after the switching to the power generation condition after the fuel cell system is instructed to stop,
    stopping the power generation, wherein the stopping of the power generation is performed after the continuing of the power generation of the fuel cell, and
    purging one of the oxidizer gas passing means of the fuel cell and a combination of the oxidizer gas passing means and the fuel gas passing means of the fuel cell for a second predetermined time, wherein the purging is performed after the stopping of the power generation.

16. The fuel cell system according to claim 15, wherein the controlling means is configured to switch the power generation condition for increasing the takeout quantity of the moisture generated in the fuel cell after the fuel cell system is instructed to stop by implementing the power generation at a load larger than a load immediately before the fuel cell system is instructed to stop.

17. The fuel cell system according to claim 15, wherein the increasing of the takeout quantity of the moisture generated in the fuel cell moves the moisture from an anode side of the fuel cell to a cathode side of the fuel cell such that the moisture is deviated to the cathode side.

18. The fuel cell system according to claim 1, wherein the increasing of the takeout quantity of the moisture generated in the fuel cell moves the moisture from an anode side of the fuel cell to a cathode side of the fuel cell such that the moisture is deviated to the cathode side.

19. The method according to claim 14, wherein the power generation condition for increasing the takeout quantity of the moisture generated in the fuel cell implements the power generation at a load larger than a load immediately before the fuel cell system is instructed to stop.

20. The method according to claim 14, wherein the increasing of the takeout quantity of the moisture generated in the fuel cell moves the moisture from an anode side of the fuel cell to a cathode side of the fuel cell such that the moisture is deviated to the cathode side.

* * * * *